June 28, 1938.  J. E. MORRIS  2,122,351
PARKING METER
Filed May 25, 1936
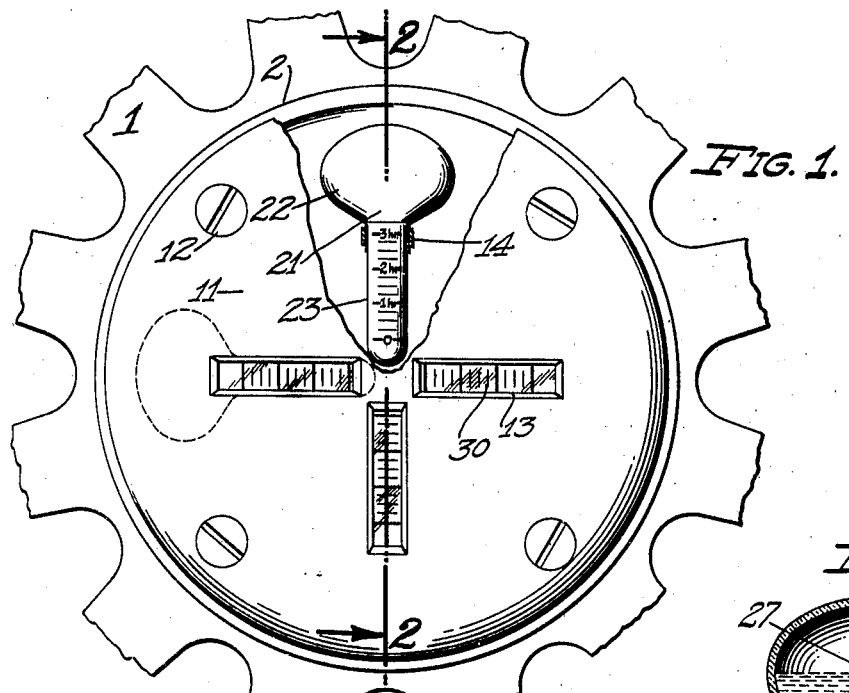
INVENTOR.
JOSEPH E. MORRIS
BY
ATTORNEY Patented June 28, 1938

2,122,351

UNITED STATES PATENT OFFICE 2,122,351

PARKING METER

Joseph E. Morris, Pasadena, Calif.

Application May 25, 1936, Serial No. 81,637

9 Claims. (Cl. 161—15)

My present invention relates to a parking meter, and more particularly to a means for measuring the time elapsed since the parking of an automobile.

One of the principal objects of this invention is to provide means of this class which is applied at all times to the vehicle, the parking time of which is to be determined when and after the vehicle is parked.

Another important object is the provision of a meter of this class which is immediately put into operation upon the parking of the vehicle, and then without the aid of human agency.

A further important object is the provision of such a meter which is reasonably accurate in measuring the elapsed parking time.

Still another important object is the provision of such a meter without mechanical working parts.

Another object of this invention is to provide such a meter which may be easily applied to any automobile.

A further object is to provide a meter of this class which is relatively simple and economical of construction and which will not readily get out of order.

With these and other objects in view, as will appear hereinafter, I have devised a parking meter having certain novel features of construction, combination, and arrangement of parts and portions, as will be hereinafter described in detail and particularly set forth in the appended claims, reference being had to the accompanying drawing and to the character of reference thereon which form a part of this application, in which:

Fig. 1 is a fragmentary side view of an automobile wheel, showing my parking meter attached thereto, and showing a portion thereof broken away to facilitate the illustration;

Fig. 2 is a fragmentary sectional elevation thereof, taken through 2—2 of Fig. 1;

Fig. 3 is an enlarged longitudinal section through one of the meter elements, a portion being shown in elevation; and, Fig. 4 is a view, similar to Fig. 2, of my invention in slightly modified form to be applied to a different type of vehicle wheel.

In the present type of automobile wheel, designated 1 in the drawing, a large hub cap 2 is employed. My parking meter is preferably made or used in connection with this hub cap or plate, either by attachment to the outer side thereof or embodied directly therein or enclosed thereby. In Figs. 1, 2 and 3, I have shown my invention embodied in or enclosed by a separate plate 11 which may be secured to the conventional hub cap or plate by screws 12, and forms substantially a part of or is one with the hub cap or plate.

The principal part of my invention is a measuring member 21, shown on an enlarged scale in Fig. 3. This member consists primarily of a reservoir or bulb 22 and a hollow stem 23. This member contains a liquid 24, preferably colored, which is adapted to flow between the bulb and the hollow stem, as will be presently described.

The hub plate, or in this instance the plate 11 is provided with radially arranged windows in the form of slots 13, preferably four in number. To the inner side of the plate 11 are secured, by means of clips 14, or other suitable means, the measuring members, one for each of the windows or slots. These measuring members are so mounted that the stems 23 are also radially arranged and placed directly behind or opposite the windows or slots 13. The reservoirs or bulbs 22 are located at the radially outer ends of the stems. These members 21 are transparent and are preferably separated from the shell or plate 11 by material, such as rubber 29. The slots or windows 13 are covered by transparent plates 30.

Between the stem and bulb of each measuring member is a wall 25 through which is an orifice 26. From this wall a tube 27 extends a considerable distance into and toward the opposite side of the bulb.

The whole measuring member, or only the stem part thereof, may be fabricated of transparent material.

The operation of my meter is briefly as follows:

As the wheel rotates, the liquid in the stem of the measuring member is forced into the bulb by centrifugal force. When the vehicle is parked and the wheel stopped, the liquid in the bulb of the uppermost measuring member seeks the level of the top of the tube 27, the remaining liquid flowing through the tube into the stem. The stem is graduated, as indicated by 28, the lowest graduation beginning at the level of the liquid in the stem which has flowed thereinto from the overflow through the tube 27. At this stage the liquid begins to drip slowly through the orifice 26, the time, required for the liquid to flow from the bulb 22 through the orifice to fill the stem, being indicated on the stem and the graduations arranged accordingly. These graduations are preferably for periods, such as, quarter hours and hours. The length of time a vehicle has been parked may be easily and quickly determined from such scale.

Only the uppermost, or one of two uppermost measuring members is read to determine the parking time.

The flow of liquid through the orifice may be impeded to the desired extent by a needle 31 or similar means arranged through the orifice.

In Fig. 4, I have shown my invention applied to a different type of wheel and hub, in which the hub extends a considerable distance outwardly from the wheel. In this instance the plate or cap 41, on which my measuring members are mounted, is cupped to a large extent. The measuring members are shaped correspondingly. In this instance also, the hub cap or plate may be secured to the wheel by J-bolts 42, or other appropriate means.

Though I have shown and described a particular construction, and a certain modification thereof, I do not wish to be limited to the same, but desire to include in the scope of my invention the construction, combination and arrangement, substantially as set forth in the appended claims.

I claim:

1. In a means of the class described, the combination with a wheel, of a plurality of measuring members, each comprising a hollow stem arranged radially with respect to the wheel and outwardly from the axis thereof and circumferentially spaced from each other, each stem having at the radially outer end a hollow bulb, the bulb being connected with the stem by a restricted orifice.

2. In a means of the class described, the combination with a wheel, of a plurality of measuring members, each comprising a hollow stem arranged radially with respect to the wheel and outwardly from the axis thereof and circumferentially spaced from each other, each stem having at the radially outer end a hollow bulb, the bulb being connected with the stem by a restricted orifice, and a tube open at its ends and extending from the radially outer end of the stem to near the radially outer end of the bulb.

3. In a means of the class described, the combination with a wheel having a large hub plate at the outer side and a plurality of narrow, radially arranged and circumferentially spaced windows in said hub plate, of a plurality of measuring members, each comprising a hollow stem also arranged radially, one positioned opposite each window, each stem having at the radially outer end a hollow bulb, the bulb being connected with the stem by a restricted orifice.

4. In a means of the class described, the combination with a wheel having a large hub plate at the outer side and a plurality of narrow, radially arranged and circumferentially spaced windows in said hub plate, of a plurality of measuring members, each comprising a hollow stem also arranged radially, one positioned opposite each window, each stem having at the radially outer end a hollow bulb, the bulb being connected with the stem by a restricted orifice, each measuring member having a tube open at its ends and extending from the radially outer end of the stem to near the radially outer end of the bulb.

5. In a vehicle wheel, a plurality of measuring members having hollow measuring stems radiating outwardly from the axis equi-angularly with respect to each other, said stems having reservoir means communicating with their outer ends.

6. In a vehicle wheel, a plurality of measuring members having hollow measuring stems radiating outwardly from the axis equi-angularly with respect to each other, said stems having reservoir means communicating with their outer ends, and restricted passages connecting the several stems with the reservoir means.

7. In a vehicle wheel, a plurality of measuring members having hollow measuring stems radiating outwardly from the axis equi-angularly with respect to each other, each stem having a hollow bulb at its outer end and a restricted passage connecting the bulb and stem.

8. In a vehicle wheel, a large hub plate at the outer side of the wheel, said plate having a plurality of narrow, radially arranged windows equi-angularly spaced with respect to each other, a plurality of measuring members, each comprising a hollow measuring stem located behind a window of the plate, said measuring members having reservoir means communicating with the stems.

9. In a vehicle wheel, a large hub plate at the outer side of the wheel, said plate having a plurality of narrow, radially arranged windows equi-angularly spaced with respect to each other, a plurality of measuring members, each comprising a hollow measuring stem located behind a window of the plate, each of the measuring members having bulbs at the outer ends of the stems and communicating with the latter.

JOSEPH E. MORRIS.